US008509146B2

(12) United States Patent
Fratti et al.

(10) Patent No.: US 8,509,146 B2
(45) Date of Patent: Aug. 13, 2013

(54) METHOD AND APPARATUS FOR DELIVERY OF HIGH RATE DATA AS PART OF A MULTIMEDIA BROADCAST/MULTICAST SERVICE

(75) Inventors: Marco Fratti, St. Germain en Laye (FR); Georges Martinez, Paris (FR); Pierre Roux, Argenteuil (FR)

(73) Assignee: Motorola Mobility LLC, Libertyville, IL (US)

( * ) Notice: Subject to any disclaimer, the term of this patent is extended or adjusted under 35 U.S.C. 154(b) by 914 days.

(21) Appl. No.: 12/066,007

(22) PCT Filed: Sep. 30, 2006

(86) PCT No.: PCT/US2006/038374
§ 371 (c)(1),
(2), (4) Date: Mar. 6, 2008

(87) PCT Pub. No.: WO2007/050235
PCT Pub. Date: May 3, 2007

(65) Prior Publication Data
US 2008/0242224 A1    Oct. 2, 2008

(30) Foreign Application Priority Data

Oct. 21, 2005   (EP) .................................... 05292217

(51) Int. Cl.
*H04W 4/00* (2009.01)
(52) U.S. Cl.
USPC .......................................... 370/328; 455/427
(58) Field of Classification Search
USPC ...................... 370/312; 455/427; 725/62–72
See application file for complete search history.

(56) References Cited

U.S. PATENT DOCUMENTS

| 2004/0085926 A1* | 5/2004 | Hwang et al. .................. 370/328 |
| 2004/0103435 A1* | 5/2004 | Yi et al. ........................... 725/81 |
| 2005/0054344 A1* | 3/2005 | Jung et al. ................... 455/432.3 |
| 2005/0083884 A1* | 4/2005 | Lee et al. ....................... 370/331 |
| 2005/0111393 A1* | 5/2005 | Jeong et al. .................... 370/312 |

(Continued)

FOREIGN PATENT DOCUMENTS

WO      WO 2004071117 A1 *   8/2004

OTHER PUBLICATIONS

Huang, L. et al.: "Resource Management over Interworking of 3G and Digital Broadcasting Networks", Ninth IFIP/IEEE International Symposium on Integrated Network Management (IM 2005), (Online) May 15-19, 2005, pp. 1-1-4, Nice, France, URL: http://www.ee.surey.ac.uk/CCSR/Software/OPNET/Huang-res-man-05.pdf.

(Continued)

*Primary Examiner* — Afshawn Towfighi (57) ABSTRACT

A communication system (100) is provided that comprises a Radio Access Network (110) having a Radio Network Controller (RNC) (114) coupled to each of a cellular Node B (112) and a Digital Broadcasting Video-Handhelds (DVB-H) Node B (120). When the communication system delivers low rate Multimedia Broadcast/Multicast Service (MBMS) user information, the user information is conveyed via the cellular Node B and a low data rate channel. When the communication system delivers high rate MBMS user information, the user information is conveyed via the DVB-H Node B and a high data rate channel. Thus the communication system provides high rate MBMS data services without imposing the system capacity constraints resulting from the employment of HSDPA by a cellular Node B.

19 Claims, 9 Drawing Sheets

(56) References Cited

U.S. PATENT DOCUMENTS

| | | |
|---|---|---|
| 2005/0192021 A1 | 9/2005 | Lee et al. |
| 2005/0281270 A1* | 12/2005 | Kossi et al. ............... 370/395.5 |
| 2006/0127032 A1* | 6/2006 | van Rooyen ................... 386/37 |
| 2006/0128420 A1* | 6/2006 | van Rooyen ............... 455/552.1 |
| 2006/0128424 A1* | 6/2006 | Rooyen ..................... 455/552.1 |
| 2007/0022200 A1* | 1/2007 | Benkert et al. ............... 709/227 |

OTHER PUBLICATIONS

Narenthiran, K, Karaliopoulos M et al.: "S-UMTS access network for broadcast and multicast service delivery: the SATIN approach", International Journal of Satellite Communications and Networking, (Online) Jan. 2005-Feb. 2005, pp. 1-21, URL: http://www.cs.unc.edu/mkaralio/papers/ijscnJan04.pdf.

Lane P, Schwartz C: "Session 1—Evolutions technologiques", Images ET Mobilite, (online) Oct. 7, 2005, pp. 1-6, Lorient, France, URL:http://www.images-mobilite.com/tables_rondes/1_2_Alcatel_Image_Mobilite_07100.5.ppt?PHPSESSID=7dfc02aeeb9aeefd1ad82fe98fa236e7>.

Herrero C et al.: "Delivery of digital television to handheld devices", Wireless Communication Systems, 2004 1st International Symposium on Mauritius Sep. 20-22, 2004, Piscataway, NJ, USA, IEEE, Sep. 20, 2004, pp. 240-244.

* cited by examiner

METHOD AND APPARATUS FOR DELIVERY OF HIGH RATE DATA AS PART OF A MULTIMEDIA BROADCAST/MULTICAST SERVICE

FIELD OF THE INVENTION

The present invention relates generally to packet data communication systems, and, in particular, to a multimedia broadcast multicast service in a packet data communication system.

BACKGROUND OF THE INVENTION

The Universal Mobile Telecommunication Service (UMTS) standard provides a compatibility standard for cellular mobile telecommunications systems. The UMTS standard ensures that user equipment (UEs) operating in a UMTS system can obtain communication services when operating in a system manufactured according to the standard. To ensure compatibility, radio system parameters and data transfer procedures are specified by the standard, including protocols governing digital control messages and bearer traffic that are exchanged over an air interface.

The UMTS standards provide, in 3GPP TS 25.344 (Third Generation Partnership Project Technical Specification 25.344), 3GPP TS 23.246, and 3GPP TS 23.846, for a provision of a Multimedia Broadcast/Multicast Service (MBMS) service by a UMTS communication system to UEs serviced by the system and subscribed to the service. More particularly, the UTMS MBMS standards provide for delivery of MBMS data to subscribed UEs through well-known unicasting or multicasting techniques in the cellular domain. However, increased radio and network efficiency is critical to an eventual widespread adoption of MBMS by service providers. In order to improve the efficiency of MBMS service delivery, it has been proposed that a High Speed Downlink Packet Access (HSDPA) high order modulation/demodulation scheme be implemented in cellular Node Bs and UEs respectively. Thus each cellular Node B would have the ability to provide both low rate and high rate MBMS data services. But implementation of HSDPA imposes power allocation problems on the Node Bs. In particular, studies have shown that under certain traffic and service constraints, HSDPA will consume a significant percentage of the transmit power of a cellular Node B and severely limit an amount of power that may be allocated to dedicated channels by the Node B, thereby imposing severe capacity constraints upon the Node B and a communication system as a whole.

Therefore, a need exists for a method and apparatus that provides for high rate MBMS data services without imposing the system capacity constraints resulting from the employment of HSDPA by a cellular Node B.

DETAILED DESCRIPTION OF THE INVENTION

To address the need for a method and apparatus that provides for high rate Multimedia Broadcast/Multicast Service (MBMS) data services without imposing the system capacity constraints resulting from the employment of HSDPA by a cellular Node B, a communication system is provided that comprises a Radio Access Network having a Radio Network Controller (RNC) coupled to each of a cellular Node B and a Digital Broadcasting Video-Handhelds (DVB-H) Node B. When the communication system delivers low rate MBMS user information, the user information is conveyed via the cellular Node B and a low data rate channel. When the communication system delivers high rate MBMS user information, the user information is conveyed via the DVB-H Node B and a high data rate channel.

Generally, an embodiment of the present invention encompasses a method for delivery of a Multimedia Broadcast/Multicast Service (MBMS) comprising receiving MBMS user information and routing the MBMS user information to a radio access network. When one or more of the MBMS user information comprises low rate data or a high data rate connection cannot be established with a user equipment (UE), conveying the MBMS user information to the UE over the air in a cellular format. When the MBMS user information comprises high rate data and a high data rate connection can be established with the UE, conveying the MBMS user information to the UE over the air in a Digital Video Broadcast format.

Another embodiment of the present invention encompasses an apparatus for provision of a Multimedia Broadcast/Multicast Service (MBMS) comprising a Radio Network Controller (RNC), a cellular Node B coupled to the RNC that conveys MBMS user information over an air interface via a low data rate channel, and a Digital Broadcasting Video-Handhelds (DVB-H) Node B coupled to the RNC that conveys MBMS user information over an air interface via a high data rate channel.

Figure 1:
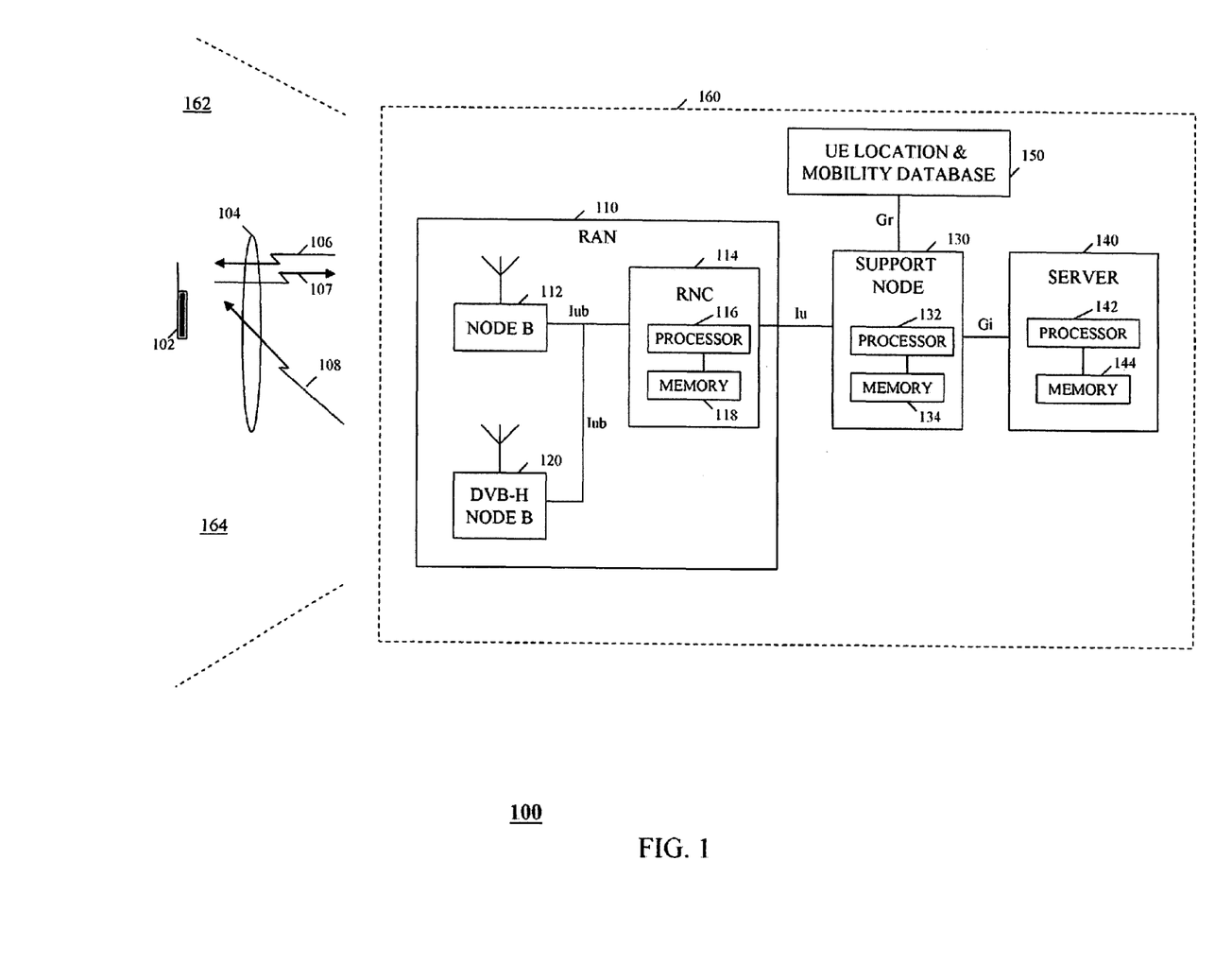
FIG. 1 is a block diagram of a wireless communication system in accordance with an embodiment of the present invention.

The present invention may be more fully described with reference to FIGS. 1-10. FIG. 1 is a block diagram of a wireless communication system 100 in accordance with an embodiment of the present invention. Communication system 100 delivers a broadcast-multicast service to user equipment (UEs) subscribed to the service. Preferably, communication system 100 is a Universal Mobile Telecommunication Service (UMTS) communication system or a GPRS communication system that operates in accordance with the 3GPP (Third Generation Partnership Project) standards, which provide a compatibility standard for UMTS or GPRS air interfaces and which standards are hereby incorporated herein in their entirety. The standards specify wireless telecommunications system operating protocols, including radio system parameters and call processing procedures, and further specify delivery of a broadcast-multicast service, that is, a Multimedia Broadcast/Multicast Service (MBMS). MBMS services are described in detail in the 3GPP (Third Generation Partnership Project) standards, and in particular in 3GPP TS (Technical Specification) 22.146, TS 23.246, TS 23.846, TS 25.344, TS 25.346 and TS 29.846, 3GPP TR (Technical Report) 21.905 v5.4.0, and Report R2-030063, which specifications and reports are hereby incorporated by reference herein and copies of which may be obtained from the 3GPP via the Internet or from the 3GPP Organization Partners' Publications Offices at Mobile Competence Centre 950, route des Lucioles, 06921 Sophia-Antipolis Cedex, France. Communication system 100 further operates in accordance with the European Telecommunications Standards (ETSI) DVB-H standards, in particular ETSI EN 302 304 V1.1.1 (2004-11), ETSI TR 102 377 V1.1.1 (2005-02), and ETSI TR 102 401 V1.1.1, which specifications and reports are hereby incorporated by reference herein and copies of which may be obtained via the Internet from www.dvb.org or from the Headquarters of the European Broadcasting Union in Geneva, Switzerland.

In another embodiment of the present invention, communication system 100 may be a Code Division Multiple Access (CDMA) 2000 communication system that operates in accordance with the 3GPP2 (Third Generation Partnership Project 2) standards. The 3GPP2 standards provide a compatibility standard for CDMA 2000 air interfaces (both 1x and HRPD) and specify wireless telecommunications system operating protocols, including radio system parameters, call processing procedures, and provision of a broadcast-multicast service, that is, a Broadcast-Multicast Service (BCMCS). A BCMCS is described in detail in the 3GPP2 (Third Generation Partnership Project Two) X.P0022, A.S00019, C.S0054, C.S0005 and S.R0083 specifications, which specifications are hereby incorporated herein in their entirety and copies of which may be obtained from the 3GPP2 via the Internet or from the 3GPP2 Secretariat with administrative offices at 2800 Wilson Boulevard, Suite 300, Arlington, Va. 22201 (USA). In yet other embodiments of the present invention, communication system 100 may operate in accordance with any other wireless telecommunication system, such as but not limited to a Time Division Multiple Access (TDMA) communication system, a Wireless Local Area Network (WLAN) system that operates in accordance with any of the any of the IEEE 802.xx standards, for example, the 802.11, 802.15, 802.16, or 802.20 standards, or an Orthogonal Frequency Division Multiple Access (OFDM) communication system.

Communication system 100 includes at least one user equipment (UE) 102 (one shown), such as but not limited to a cellular telephone, a radio telephone, a personal digital assistant (PDA) with radio frequency (RF) capabilities, or a wireless modem that provides RF access to digital terminal equipment (DTE) such as a laptop computer, in wireless communication with a Radio Access Network (RAN) 110. UE 102 is capable of receiving and displaying audio, video, and/or data associated with an MBMS service provided by communication system 100, which service provides for a distribution of MBMS data to UEs. RAN 110 includes at least one cellular Node B 112 that is coupled to a Radio Network Controller (RNC) 114 via an Iub interface. RAN 110 further includes a DVB-H (Digital Video Broadcasting-Handhelds) Node B 120 that is coupled to RAN 110, and in particular to RNC 114, via an Iub interface and that operates in accordance with the DVB-H standards. As is know in the art, DVB-H Node B 120 employs IP (Internet Protocol) datacasting technology for broadcast of multimedia services to user equipment, such as UE 102, serviced by communication system 100.

Communication system 100 further includes a support node 130 coupled to RAN 110 via an Iu interface and an MBMS server 140, preferably a Broadcast Multicast Service Center (BM-SC), that is coupled to support node 130 via a Gi interface. Support node 130 typically includes one or more Serving 3G-GPRS Support Nodes (SGSNs) that are each coupled to one or more Gateway 3G-GPRS Support Nodes (GGSNs). However, the precise architecture of support node 130 is up to an operator of communication system 100 and is not critical to the present invention. Support node 130 is further coupled, via a Gr interface, to a UE Location and Mobility Database 150 that comprises a Home Location Register (HLR), a Visitor Location Register (VLR), or a combination of an HLR and a VLR. As is known in the art, a UE Location and Mobility Database such as an HLR or a VLR includes mobility and provisioning information associated with each UE subscribed to and/or registered for the services of communication system 100, such as a profile of the UE including the capabilities of the UE, such as services and operating parameters, for example, data rates and QoS, supported by the UE, and a RAN, and more particularly a Node B, currently serving the UE. In particular, the information about the serving RAN is dynamically updated in the Support Node and shared with the UE Location and Mobility Database, that is, the associated HLR and/or VLR, whenever necessary. Preferably, UE Location and Mobility Database 150 further maintains an association between the Node B and a DVB-H Node B that provides DVB-H services in the coverage area of the Node B. Together, RAN 110, support node 130, server 140, and UE Location and Mobility Database 150 are collectively referred to herein as a communication system infrastructure 160. Further, support node 130, server 140, and UE Location and Mobility Database 150 are collectively referred to herein as a packet switched core network of infrastructure 160.

RAN 110 provides communications services to coverage areas 162 and 164, such as one or more cells or one or more sectors of a cell, and to user equipment, such as UE 102, located in the coverage areas via a Uu air interface 104. In particular, Node B 112 provides communications services to a coverage area 162 and to user equipment, such as UE 102, located in the coverage area 162 via a UMTS or GPRS downlink 106 and an UMTS or GPRS uplink 107 of air interface 104. DVB-H Node B 120 provides communications services to a high rate data coverage area 164 and to user equipment, such as UE 102, located in the coverage area 164 via a high data transmission rate downlink 108, and more particularly a DVB-H downlink, of air interface 104. Coverage areas 162 and 164 overlap and thus a UE serviced by communication system 100, such as UE 102, is able to obtain conventional MBMS services from RAN 110 and is further able to obtain high data rate MBMS services from DVB-H Node B 120. Each of downlinks 106 and 108 and uplink 107 includes one or more physical channels, wherein each physical channel comprises one or more transport channels that, in turn, each comprises one or more logical channels.

Communication system 100 may further include an MBMS content provider (not shown), such as an IP multicast server, that is coupled to infrastructure 160, and in particular to server 140, via a data network such as an IP (Internet Protocol) network. As part of an MBMS service provided by communication system 100 and that may be subscribed to by UE 102, MBMS content provider may source MBMS data, typically in the form of IP data packets, to UE 102 via server 140, support node 130, RNC 114, and cellular Node B 112 and/or via server 140, support node 130, RNC 114, and DVB-H Node B 120.

Figure 2:
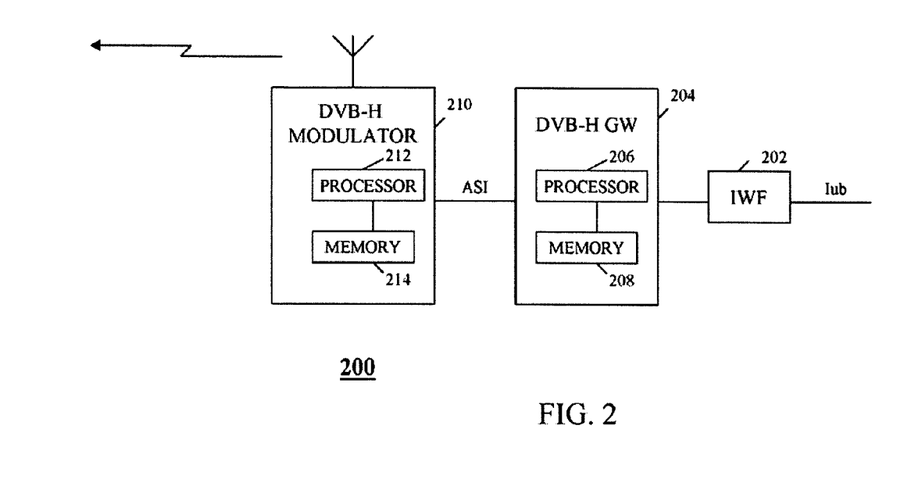
FIG. 2, a block diagram is provided of a DVB-H (Digital Video Broadcast-Handheld) Node B in accordance with an embodiment of the present invention.

Referring now to FIG. 2, a block diagram 200 is provided of a DVB-H Node B 200, such as DVB-H Node B 120, in accordance with an embodiment of the present invention. DVB-H Node B 200 includes a DVB-H modulator 210 coupled to a DVB gateway 204 via an Asynchronous Serial Interface (ASI) interface. In turn, DVB gateway 204 is coupled to an Interworking function (IWF) 202. In a UMTS communication system, IWF 202 receives an IP (Internet Protocol) or Asynchronous Transfer Mode (ATM) data packet from a UMTS RNC, such as RNC 114, via an Iub interface and performs a protocol conversion, converting the data packet from a UMTS format to a format suitable for further processing by DVB-H Gateway 204. DVB Gateway 204 encapsulates the converted data packet by applying DVB-H headers and tails as is known in the art and specifically in conformance to the DVB-H Multi-Protocol Encapsulation procedure. DVB Gateway 204 then conveys the encapsulated data packet to DVB-H modulator 210 and the modulator modulates the encapsulated data packet with error correction coding and channel coding appropriate for a DVB-H transmission as is known in the art and further modulates a radio frequency (RF) carrier with the coded data packet for RF transmission to UEs serviced by DVB-H Node B 200.

Referring now to FIGS. 1 and 2, each of RNC 114, support node 130, server 140, DVB-H modulator 142, DVB-H gateway 160, and UE 102 includes a respective processor 116, 132, 142, 144, 212, and 206, such as one or more microprocessors, microcontrollers, digital signal processors (DSPs), combinations thereof or such other devices known to those having ordinary skill in the art. Each of RNC 114, support node 130, server 140, and UE 102 further includes a respective one or more memory devices 118, 134, 144, 214, and 208 associated with the respective processor, such as random access memory (RAM), dynamic random access memory (DRAM), and/or read only memory (ROM) or equivalents thereof, that store data and programs that may be executed by the processor and allow the processor to operate in communication system 100. The one or more memory devices 134 of support node 130 further maintains a support node identifier that is uniquely associated with the support node. When support node 130 includes one or more SGSNs and one or more GGSNs, the functions described herein as being performed by the support node may be performed by the one or more SGSNs or by the one or more GGSNs, and more particularly a processor of each of the one or more SGSNs or GGSNs based data and programs stored in an associated one or more memory device of the SGSNs or GGSNs, or may be distributed among the one or more SGSNs and one or more GGSNs.

Figure 3:
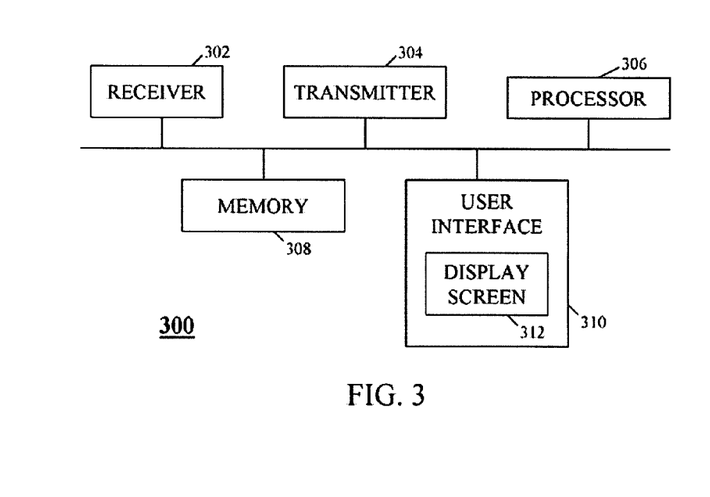
FIG. 3 is a block diagram of a user equipment in accordance with an embodiment of the present invention.

FIG. 3 is a block diagram of a UE 300, such as UE 102, in accordance with an embodiment of the present invention. UE 102 supports a cellular technology, such as UMTS and/or GPRS, and further supports the DVB-H technology. UE 102 includes a processor 306, such as one or more microprocessors, microcontrollers, digital signal processors (DSPs), combinations thereof or such other devices known to those having ordinary skill in the art. UE 102 further includes one or more memory devices 308 associated with the processor, such as random access memory (RAM), dynamic random access memory (DRAM), and/or read only memory (ROM) or equivalents thereof, that store data and programs that may be executed by the processor and allow the processor to operate in communication system 100. The one or more memory devices 308 of UE 102 further maintains a mobile identifier (mobile ID) associated with the MS and a Service Identifier (Service ID) associated with an MBMS service feature provided by communication system 100 and subscribed to by the UE. UE 102 further includes a receiver 302, a transmitter 304, and user interface 310 that are coupled to processor 306. Receiver 302 and transmitter 304 respectively provide for receiving and transmitting messages by the UE. Receiver 302 downconverts a received DVB-H transmission and a DVB-H demodulator (not shown) of processor 306 demodulates the downconverted DVB-H transmission to produce a demodulated IP data packet. Processor 306 further includes a DVB-H IP-Decapsulator (not shown) that decapsulates the demodulated IP data packet. User interface 310 may include a display screen 312 and provides a user of the UE with the capability of interacting with the MS, including inputting instructions into the UE.

The embodiments of the present invention preferably are implemented within each of UE 102, RAN 110, and in particular DVB-H Node B 120 and RNC 114, support node 130, and server 140 with or in software programs and instructions stored in the one or more memory devices and executed by the processor of the UE, DVB-H Node B, RNC, support node, and server. However, one of ordinary skill in the art realizes that the embodiments of the present invention alternatively may be implemented in hardware, for example, integrated circuits (ICs), application specific integrated circuits (ASICs), and the like, such as ASICs implemented in the UE, DVB-H Node B 120, RNC, support node, and server and all references to 'means for' herein may refer to any such implementation of the present invention. Based on the present disclosure, one skilled in the art will be readily capable of producing and implementing such software and/or hardware without undo experimentation.

Figure 4:
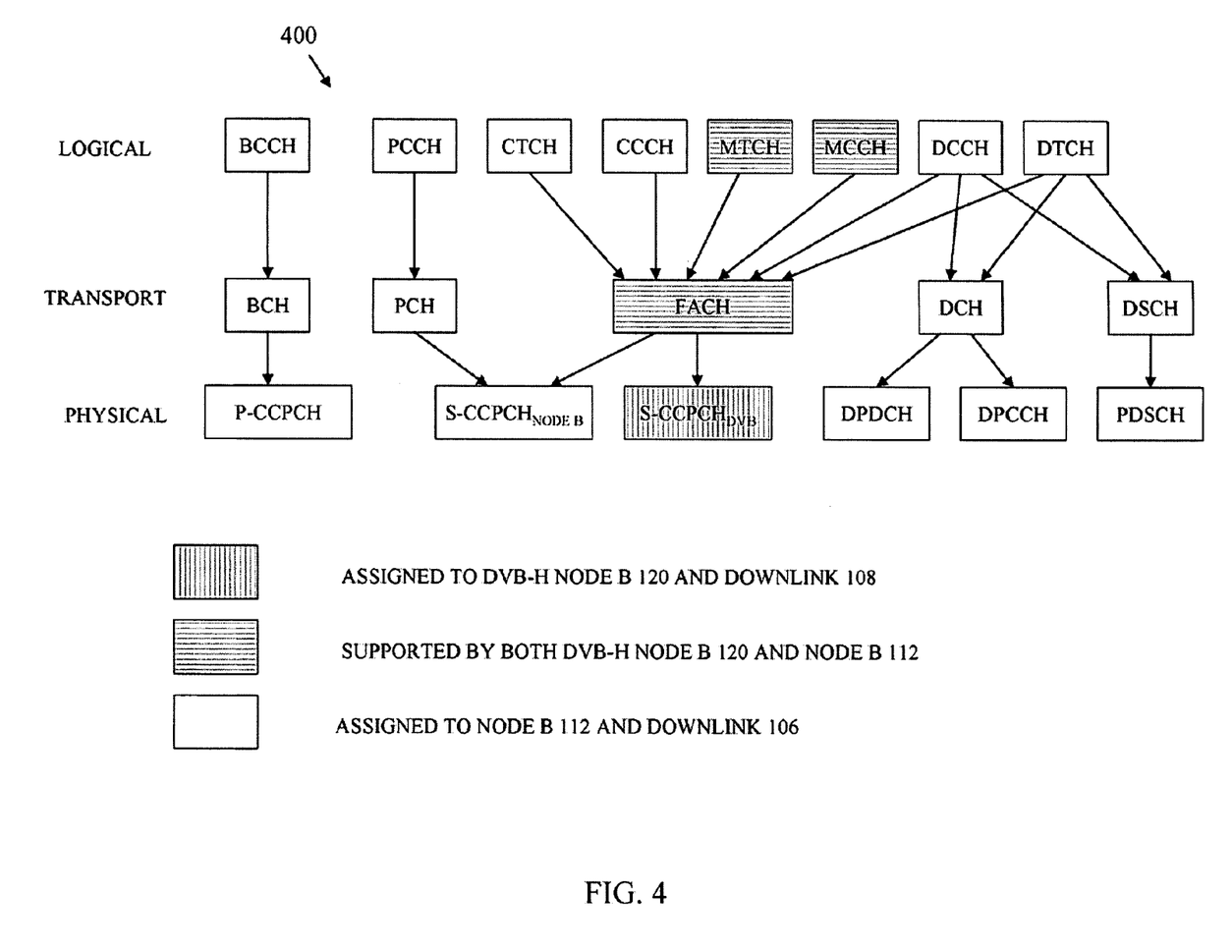
FIG. 4 is a channel map that illustrates a mapping of channels to downlinks of an air interface of FIG. 1 in accordance with an embodiment of the present invention.

Referring now to FIG. 4, a channel map 400 is provided that illustrates a mapping of channels to downlinks 106 and 108 of air interface 104 in accordance with an embodiment of the present invention. Typically, there are two types of logical channels in a UMTS communication system, that is, control channels that are used to control the radio links (C-plane signaling) and traffic channels that carry user information to and from UEs via the radio links (U-plane information). As depicted in channel map 400, UMTS downlink 106 comprises multiple logical control channels, including a Broadcast Control Channel (BCCH), a Paging Control Channel (PCCH), a Common Control Channel (CCCH), and a Dedicated Control Channel (DCCH). UMTS downlink 106 further comprises multiple logical traffic channels, including a Dedicated Traffic Channel (DTCH) and a Common Traffic Channel (CTCH). UMTS downlink 106 further comprises multiple transport channels, wherein the following downlink 106 logical channels are mapped to the following downlink 106 traffic channels: the BCCH to a Broadcast Channel (BCH), the PCCH to a Paging Channel (PCH), each of the CTCH and the CCCH to a Forward Access Channel (FACH), and each of the DCCH and DTCH to either a Dedicated Transport Channel (DCH) or a Downlink Shared Channel (DSCH). In turn, the UMTS downlink 106 transport channels may be mapped to the following UMTS downlink 106 physical channels: the BCH to a Primary Common Control Physical Channel (P-CCPCH), each of the PCH and the FACH to a Secondary Common Control Physical Channel (S-CCPCH) specifically allocated to Node B 112 (depicted in channel map 400 as S-CCPCH$_{NODE\ B}$), the DCH to one of either a Dedicated Physical Data Channel (DPDCH) and a Dedicated Physical Control Channel (DPCCH), and the DSCH to a Physical Downlink Shared Channel (PDSCH).

Air interface 104 further includes an MBMS Traffic Channel (MTCH) and an MBMS Control Channel (MCCH), which logical channels respectively are used to convey MBMS traffic and signaling. The MTCH and MCCH are each mapped to the FACH and may be utilized for signaling or a conveyance of user information to UE 102 by either RAN 110 via UMTS downlink 106 or DVB-H Node B 120 via DVB downlink 108. When DVB-H Node B 120 broadcasts signaling or user information via either the MTCH or the MCCH, the DVB-H Node B maps the FACH comprising the MTCH and/or the MCCH to an S-CCPCH, a physical channel, that is specifically allocated to the DVB-H Node B and which is depicted in channel map 400 as S-CCPCH$_{DVB}$. When Node B 112 conveys signaling or user information via either the MTCH or the MCCH, the Node B maps the FACH comprising the MTCH and/or the MCCH to the S-CCPCH that is specifically allocated to Node B 112, that is, the S-CCPCH$_{NODE\ B}$.

As part an MBMS service feature supported by communication system 100, UE 102 may subscribe to, and receive delivery of, an MBMS service, such as a broadcast of an event, such as an athletic event, for example, a soccer game, a baseball game, or a football game, a concert event, or any other type of entertainment event or other event that may be broadcast, which broadcast may include one or more communication sessions during which data concerning the event is conveyed to the subscribing UE. When the MBMS service involves a delivery of high rate data, such as video or other types of high rate data (as opposed to voice), communication system 100 delivers the high rate data to the UE via DVB-H Node B 120 and high data rate downlink 108. By providing a DVB-H Node B and an associated high data rate downlink for delivery of the MBMS data, communication system 100 provides an efficient delivery system for high rate MBMS data without encumbering cellular Node B 112 with the power consumption, and resulting capacity limitations, resulting from a provision of a high rate MBMS data service by the cellular Node B.

Figure 5:
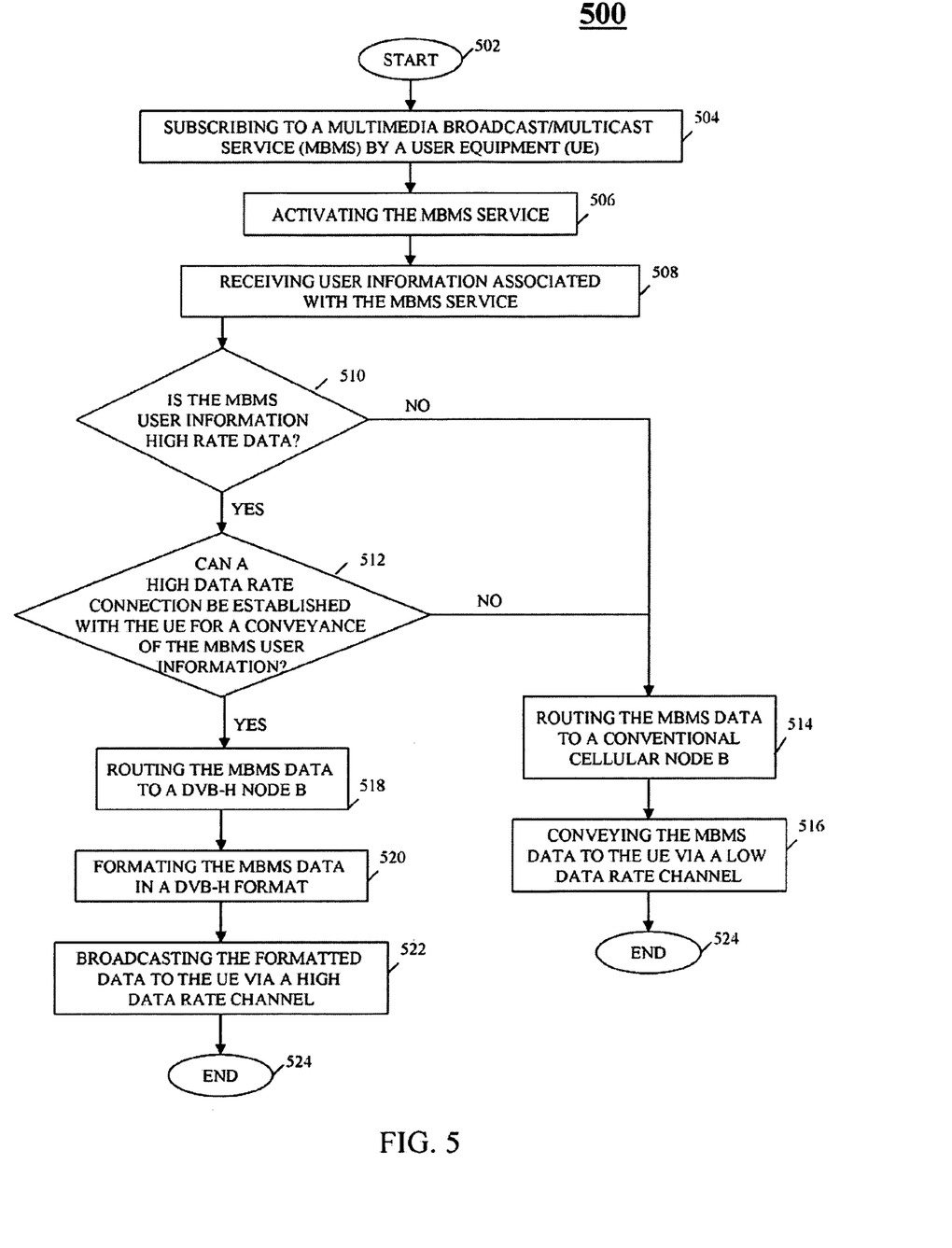
FIG. 5 is a logic flow diagram that illustrates a provision of a high rate Multimedia Broadcast/Multicast Service (MBMS) data service by the communication system of FIG. 1 in accordance with an embodiment of the present invention.

Referring now to FIG. 5, a logic flow diagram 500 is provided that illustrates an provision of a high rate MBMS data service by communication system 100 in accordance with an embodiment of the present invention. Logic flow 500 begins (502) when UE 102 subscribes (504) to an MBMS service provided by communication system 100. UE 102 may subscribe to an MBMS service, such as a multimedia broadcast of a sporting event, when communication system 100, and in particular server 140, conveys a service announcement concerning the MBMS service to each UE, such as UE 102, serviced by the communication system. The service announcement may be sent in any over-the-air format, such as via a broadcast over a paging channel of downlink 106, via a short message service (SMS), or via a multicast. The service announcement comprises information concerning the event, which information may be used by a user of a UE to determine whether to subscribe to the event. For example, the information concerning the event may include a routing address, such as an Internet Protocol (IP) address, associated with the MBMS content provider sourcing the data related to the event and various other information that identifies the event.

In response to receiving the service announcement, UE 102 determines whether to subscribe to the MBMS service identified in the service announcement. When UE 102 determines to subscribe to the service, the UE conveys to network 160, and in particular to support node 130 via Node B 112 and RNC 114, a request to subscribe to the MBMS service. The subscription request includes an identifier associated with the MBMS service and may further include the routing address of the server associated with the MBMS service.

In response to receiving the subscription request, support node 130 authenticates the UE and determines a RAN serving the UE, that is, RAN 110, and in particular RNC 114, Node B 112, and DVB-H Node B 120, by reference to UE Location and Mobility Database 150. Support node 130 further creates a UE-specific MBMS context and stores, in at least one memory device 134 of the support node and in association with the UE, parameters associated with the MBMS service, an identifier associated with the UE and any other information retrieved by the support node from the UE's profile in UE Location and Mobility Database 150, and routing information for the UE, including the RNC, Node B, and DVB-H Node B serving the UE. In addition, support node 130 determines whether the subscribing UE, that is, UE 102, is a first UE to activate this specific MBMS service on this support node. When UE 102 is the first UE activating this specific MBMS service on this support node, support node 130 conveys a message to server 140 requesting to participate in the MBMS service. Server 140 then stores information identifying the support node in association with the MBMS service. When UE 102 is not the first UE activating this specific MBMS service on this support node, support node 130 may or may not convey a message to server 140 informing of the UE's request to participate in the MBMS service.

Server 140 or support node 130 further generates or retrieves one or more of a Temporary Mobile Group Identifier (TMGI) associated with the service and conveys the TMGI associated with the service to the UE. Similar to the service announcement, the TMGI may be conveyed via any over-the-air format, such as via a broadcast over a paging channel, via a short message service (SMS), or via a multicast, and is included in a message that includes the mobile ID associated with the UE subscribing to the event, allowing the UE to determine that it is an intended recipient of the TMGI. Upon receiving the TMGI, the UE stores the TMGI in the one or more memory devices 208 of the UE.

Upon activation (506) of the MBMS service, the MBMS content provider or an application running on server 140 provides to infrastructure 160, and the infrastructure, in particular server 140, receives (508) a set of data packets comprising user information associated with the MBMS service. In one embodiment of the present invention, in response to receiving the set of data packets, server 140 conveys the received data to support node 130. In response to receiving the data, support node 130 determines, by reference to UE Location and Mobility Database 150 or to the context maintained by the support node in association with each subscribed UE, the RANs/RNCs participating in the MBMS service, that is, the RANs/RNCs serving UEs that subscribed to the MBMS service via the support node, such as RAN 110/RNC 114. Support node 130 then notifies the participating RANs/RNCs of the activation of the MBMS service, for example, by conveying an MBMS Notification message to the RAN/RNC that includes the TMGI.

In other embodiments of the present invention, in response to receiving the set of data packets, server 140 may convey a message to support node 130, and in particular to a GGSN, that informs the support node that an MBMS session is about to start. For example, the session start message may comprise an MBMS Request or an MBMS-Session-Start-Request that includes MBMS service parameters, such as an identifier associated with the session (a Session ID and/or an MBMS ID) and a data rate and/or Quality of Service (QoS) attributes, associated with the MBMS service. The GGSN determines the SGSNs that are participating in the MBMS service and forwards a message requesting that each such SGSN initiate an MBMS transmission, which message includes the MBMS service parameters along with a routing address, such an IP address, of the GGSN. Support Node 130, and in particular each SGSN of the support node participating in the MBMS service, then determines, by reference to UE Location and Mobility Database 150 or to the context maintained by the support node in association with each subscribed UE, the RANs/RNCs participating in the MBMS service.

For each participating RAN/RNC, such as RAN 110/RNC 114, support node 130 initiates an establishment of a Radio Access Bearer (RAB) by conveying a data rate and/or Quality of Service (QoS) attributes associated with the MBMS service to the RNC. Support node 130 may further convey the Session ID/MBMS ID, broadcast area identifier, and a routing address, such an IP address, of the support node, and more particularly of the SGSN initiating the establishment of the RAB. Preferably, support node 130 initiates an establishment of a Radio Access Bearer (RAB) with the participating RNC by conveying a RAB Request comprising such information to the RNC. In response to receiving the request to establish a RAB, a participating RAN, such as RAN 110 and in particular RNC 114 of RAN 110, establishes an Iu bearer between the RNC and support node 130. RNC 114 further opens a context for each UE serviced by the RNC.

RAN 110 further notifies UEs serviced by the RAN, that is, UE 102, of the activation of the MBMS service, for example, by broadcasting an MBMS Notification message to the UEs via Node B 112 and a control channel of downlink 106. The notification conveyed to UE 102 includes an identifier associated with the MBMS service (the Session ID and/or the MBMS ID) and/or the TMGI. RAN 110 further requests service from support node 130, for example, by conveying an MBMS Service Request message to the support node. In response to receiving the notification from RAN 110, each UE that is subscribed to the MBMS service, that is, UE 102, and wakes up if in idle mode. UE 102 then conveys a connection request, typically a Layer 3 Radio Resource Control (RRC) connection establishment request, to RNC 114 via an access channel of uplink 107. UE 102 further informs the RNC of the service parameters that the UE can support, such as data rates, QoS, and other operating parameters supported by the UE and the RNC stores this information in the context associated with the UE. However, in another embodiment of the present invention, RNC may be conveyed this information by support node 130, which support node may obtain this information as part of the UE's profile maintained by UE Location and Mobility Database 150. Based on the service parameters associated with the MBMS service, such as a data rate and/or QoS parameters, and the context associated with the UE, RNC 114 determines (510) whether the MBMS user information comprises high rate data, such as event highlights or a video clip, and when the MBMS user information comprises high rate data, further determines (512) whether a high data rate connection may be established with the UE for delivery of the MBMS user information.

When the MBMS user information is not high rate data or a high data rate connection cannot be established with the UE for delivery of the MBMS data, then RNC 114 establishes a Point-to-Multipoint (PTM) or a Point-to-Point (PTP) connection with UE 102 via cellular Node B 112, whichever is appropriate, and routes (514) the MBMS user information to Node B 112. Node B 112 then multicasts or unicasts (516) the MBMS user information, whichever is appropriate, in a conventional cellular format via cellular downlink 106 in accordance with well known MBMS techniques. Logic flow 500 then ends (524).

When RNC 114 determines that the MBMS user information is high rate data that may be delivered via a high data rate connection, RNC 114 routes (518) the MBMS user information to DVB-H Node B 120. DVB-H Node B 120 formats (520) the MBMS user information in a DVB format for an over the air transmission and broadcasts (522) the data to UE 102 via a common traffic channel of high data rate downlink 108. Logic flow 500 the ends (524). Each data packet broadcast by DVB-H Node B 120 preferably includes a TMGI associated with the MBMS service, or other identifier of the MBMS service, that is included in the packet by one of server 142 or support node 130 and that allows the receiving UE to determine that it is an intended recipient of the data packet.

Figure 6:
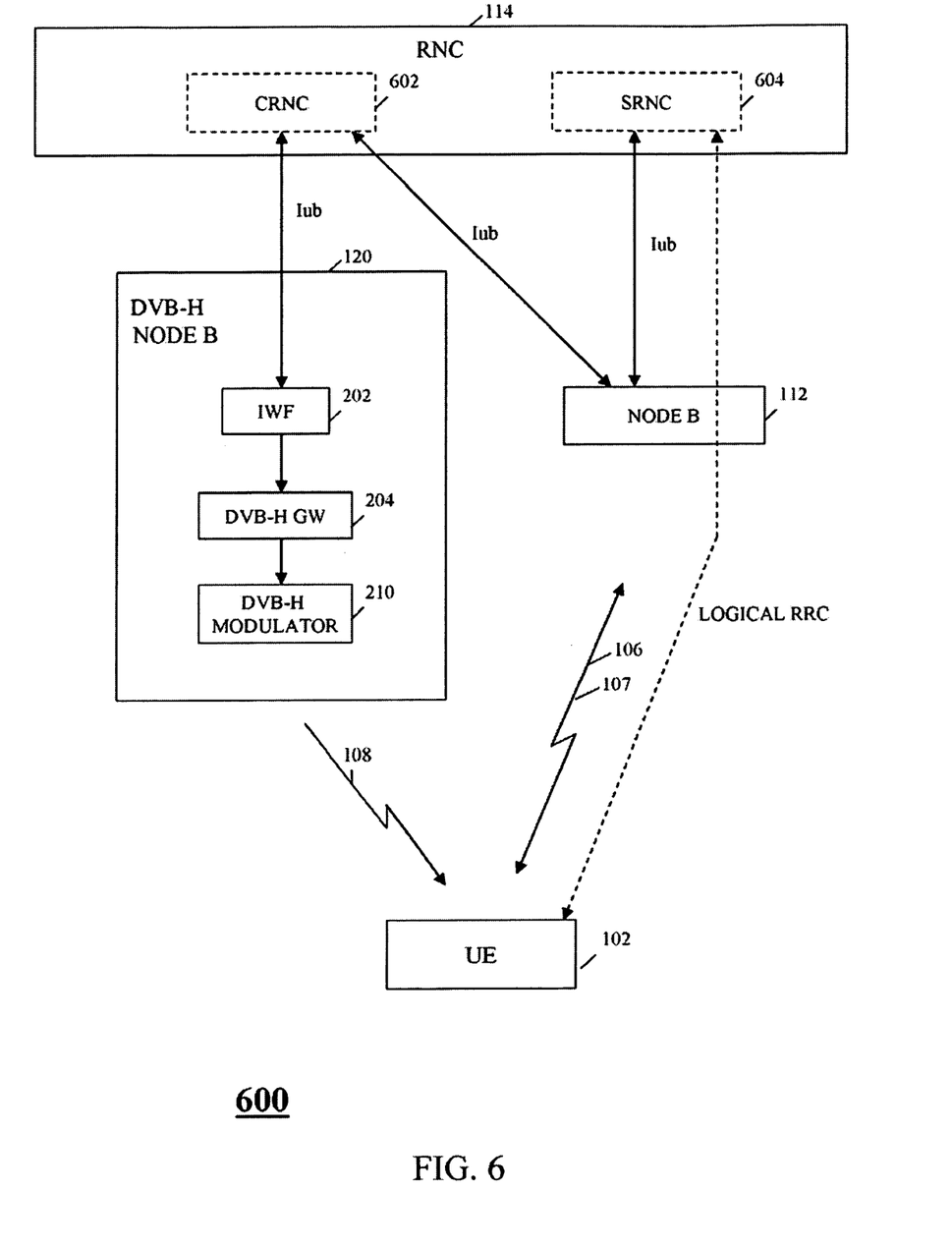
FIG. 6 is a block diagram that illustrates an exemplary C-plane connection established by the communication system of FIG. 1 in association with an MBMS communication session in accordance with an embodiment of the present invention.
Figure 7:
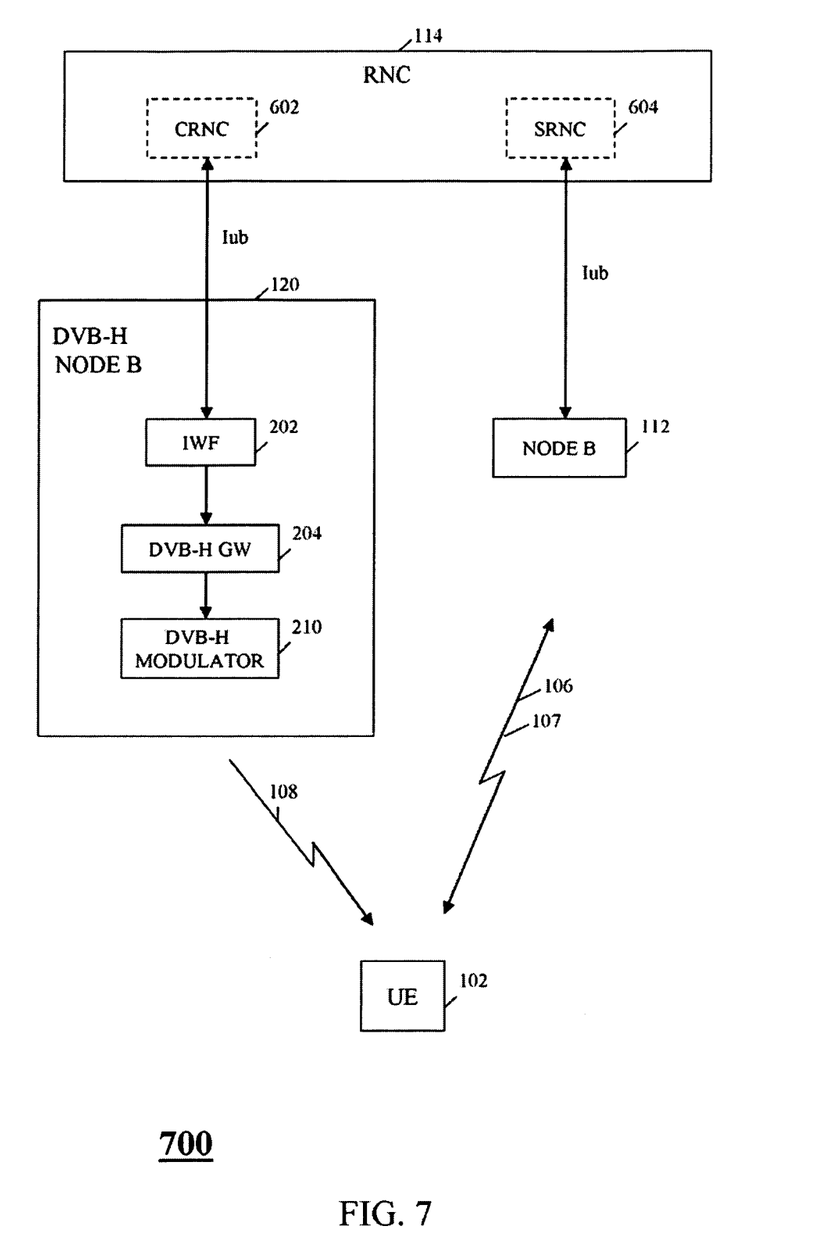
FIG. 7 is a block diagram that illustrates an exemplary U-plane connection established by the communication system of FIG. 1 in association with an MBMS communication session in accordance with an embodiment of the present invention.

Referring now to FIGS. 6 and 7, block diagrams are provided that illustrate exemplary C-plane and U-plane connections established by communication system 100 in association with a high data rate MBMS communication session in accordance with an embodiment of the present invention. FIG. 6 is a block diagram 600 of exemplary C-plane connections. As depicted in FIG. 6, RNC 114 sets up an RRC connection with UE 102 via Node B 112. More particularly, RNC 114 terminates the RRC connection with a Serving RNC (SRNC) 604 instantiation of the RNC functionality. In turn, Node B 112 is in communication with, and is provided signaling by, each of SRNC 604 and a Controlling RNC (CRNC) 602. In one embodiment of the present invention, CRNC 602 and SRNC 604 may comprise different instantiations of a same RNC, that is, RNC 114. However, one of ordinary skill in the art realizes that CRNC 602 and SRNC 604 need not be implemented in a same RNC and in another embodiment of the invention CRNC 602 and SRNC 604 may be implemented in different RNCs. DVB-H Node B 120, and in particular IWF 202 of the DVB-H node B, is in communication with, and is provided signaling by, CRNC 602. In other words, CRNC 602 provides a signaling point of connection between DVB-H Node B 120 and the packet switched core network of communication system 100, that is, support node 130, server 140, and UE Location and Mobility Database 150, and CRNC 602 and SRNC 604 provide signaling points of connection between Node B 112 and the packet switched core network.

FIG. 7 is a block diagram 700 of exemplary U-plane connections. As depicted in FIG. 7, DVB-H Node B 120, and in particular IWF 202 of the DVB-H node B, is in communication with, and is provided MBMS user information by, a Controlling RNC (CRNC) 602. Node B 112 is in communication with, and is provided MBMS user information by, a Serving RNC (SRNC) 604. As noted above, in one embodiment of the present invention, CRNC 602 and SRNC 604 may comprise different instantiations of a same RNC, that is, RNC 114; however, CRNC 602 and SRNC 604 need not be implemented in a same RNC and instead may be implemented in different RNCs. CRNC 602 provides a bearer traffic point of connection between DVB-H Node B 120 and the packet switched core network of communication system 100 and SRNC 604 provides a bearer traffic point of connection between Node B 112 and the packet switched core network.

When communication system 100 has high rate MBMS data to deliver to subscribed UEs, that is, UE 102, residing in coverage area 162, the communication system routes the user information to support node 130. Support node 130 then routes the user information to CRNC 602 and, via the CRNC, to DVB-H Node B 120. DVB-H Node B 120 then broadcasts the user information to UE 102 via high data rate downlink 108, and in particular via an MTCH/FACH/S-CCPCH$_{DVB}$. When communication system 100 has non-high rate MBMS data that is intended for subscribed UEs, that is, UE 102, residing in coverage area 162, the communication system routes the non-high rate MBMS data to support node 130 and the support node routes the user information to SRNC 604. SRNC 604 then routes the MBMS data to Node B 112 and the Node B multicasts or unicasts the user information to UE 102 in accordance with techniques known in the art.

Thus, by having a RAN 110 that includes an RNC 114 coupled to each of a cellular Node B 112 and a DVB-H Node B 120, communication system 100 is able to provide high rate MBMS data to a coverage area service by the RAN via a high rate channel without imposing the system capacity constraints resulting from the prior art proposal of employment of HSDPA by a cellular Node B. As described in detail above, when communication system 100 delivers low rate Multimedia Broadcast/Multicast Service (MBMS) user information to the coverage area, the communication system conveys the user information via the cellular Node B and a low data rate channel. When communication system 100 delivers high rate MBMS user information to the coverage area, the communication system conveys the user information via the DVB-H Node B and a high data rate channel.

The coverage areas of the cellular Node B and the DVB-H Node B need not be co-extensive. For example, referring now to FIG. 8, a block diagram is provided that illustrates a provision of MBMS services by a communication system 800 in accordance with another embodiment of the present invention. In communication system 800, a number of RNCs exceeds a number of DVB coverage areas, or cells. Communication system 800 comprises a first Node B 812 that is serviced by a first RNC 810 and that provides MBMS services to a first coverage area 816 via a first downlink 814, that is, a UMTS or GPRS downlink. Communication system 800 further comprises a second Node B, that is, Node B 822, that is serviced by a second RNC, that is, RNC 820, and that provides MBMS services to a second coverage area 826 via a second downlink 824 that is also a UMTS or GPRS downlink. Second RNC 820 also serves as a controlling RNC (CRNC) for a DVB-H Node B 830 that provides high data rate MBMS services to a third coverage area 834, that is, a high rate data coverage area, via a third downlink 832, that is, a high data rate DVB downlink. Third coverage area 834 overlaps with at least a portion of each of first coverage area 816 and second coverage area 826.

Figure 8:
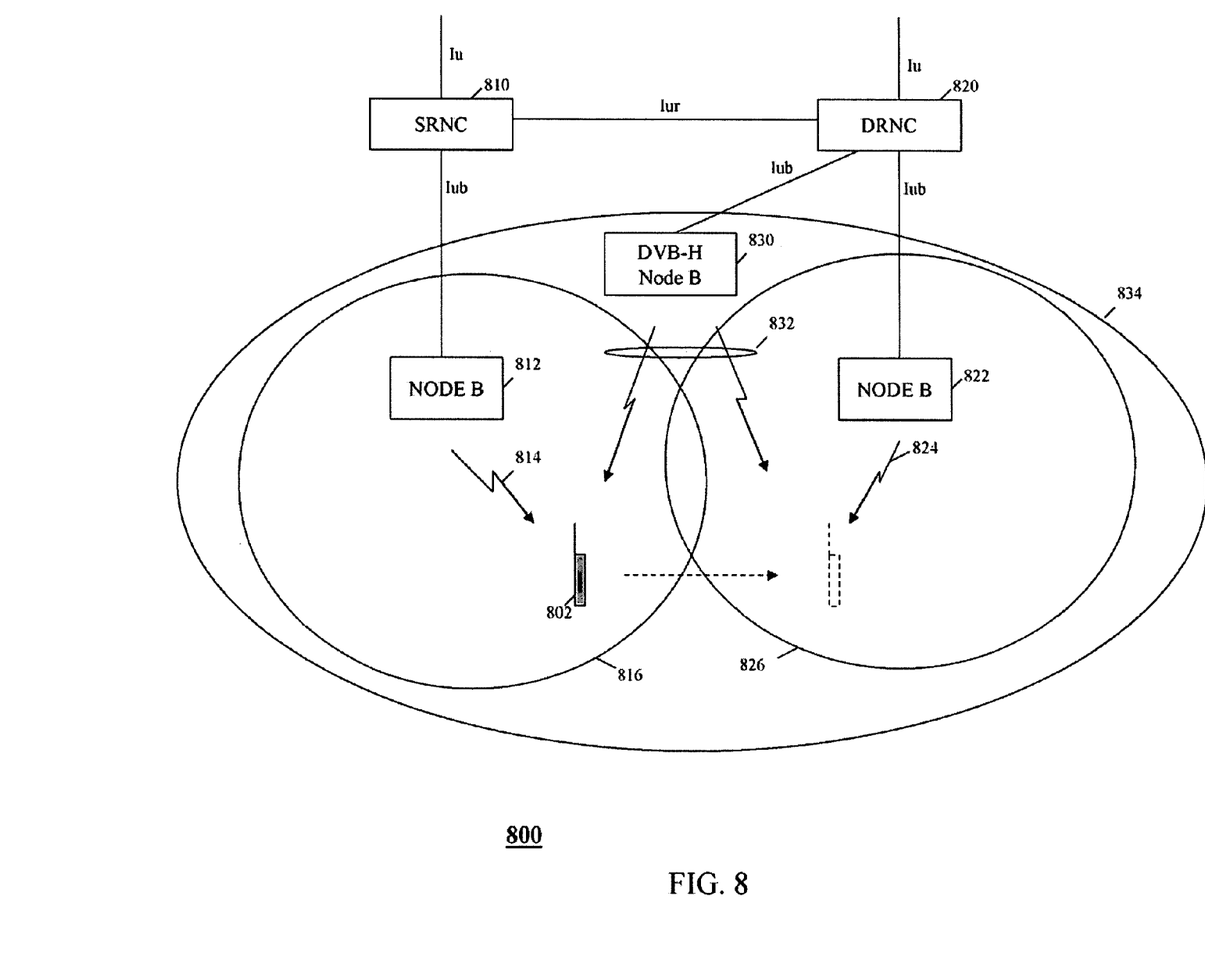
FIG. 8 is block diagram illustrating a provision of MBMS services by a communication system in accordance with another embodiment of the present invention.

A UE, that is, UE 802, initially resides in each of first coverage area 816 and third coverage area 834. The RNC serving coverage area 816, that is, RNC 810, establishes a Radio Resource Control (RRC) connection with UE 802, which connection terminates at each of the RNC and the UE. Thus, RNC 810 acts as the serving RNC (SRNC) for the RRC connection to UE 802. While UE 802 resides in first coverage area 816, communication system 800 provides MBMS services to UE 802 via a core network (not shown), first RNC 810, first Node B 812, and first downlink 814. Further, while UE 802 also resides in third coverage area 834, communication system 800 provides high rate MBMS services to UE 802 via the core network, second RNC 820, DVB-H Node B 830, and third downlink 832, bypassing first RNC 810 and first Node B 812.

UE 102 then moves to second coverage area 826, which coverage area is controlled by second RNC 820. That is, the UE is considered to have "drifted" to RNC 820. However, even after the move, UE 802 continues to reside in third coverage area 834. Notwithstanding the move, RNC 810 continues to serve as the SRNC for UE 802 (unless an SRNC relocation is performed) and the RRC connection to UE 802 continues to terminate at SRNC 810. SRNC 810 establishes an Iur interface with the second RNC 820 and the second RNC then acts as a Drift RNC (DRNC) for the UE. When communication system 800 has non-high rate MBMS data intended for UE 802, the communication system continues to route the data to SRNC 810 via the core network. SRNC 810 then conveys the data to DRNC 820 via the Iur interface and DRNC 820 conveys the data to UE 802 via second Node B 822 and second downlink 824. However, communication system 100 continues to route high rate MBMS data to UE 802 via the core network, second RNC 820, DVB-H Node B 830, and third downlink 832, bypassing first RNC 810 and first Node B 812 even after the move.

Figure 9:
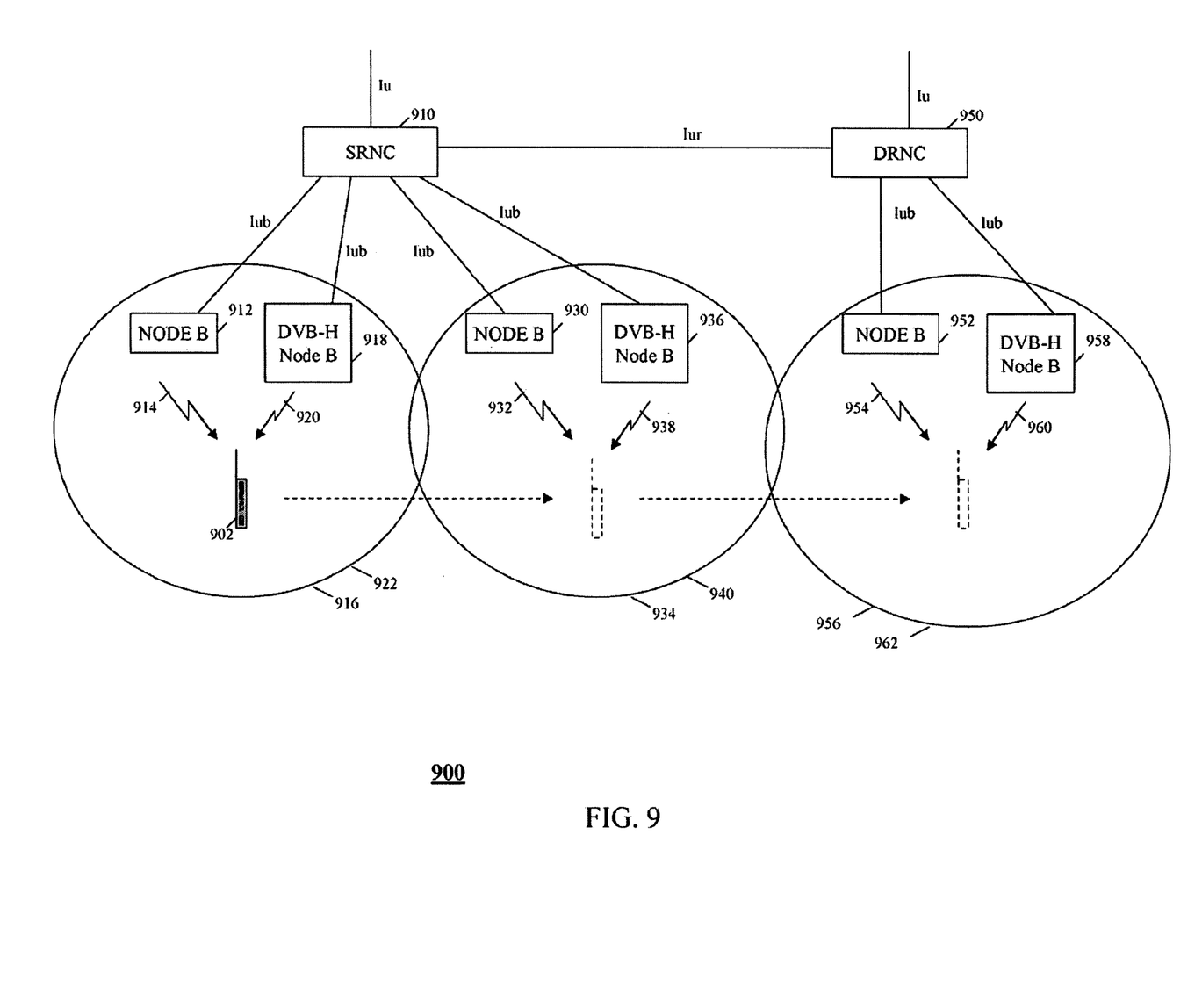
FIG. 9 is block diagram illustrating a provision of MBMS services by a communication system in accordance with another embodiment of the present invention.

FIG. 9 is block diagram illustrating a provision of MBMS services by a communication system 900 in accordance with yet another embodiment of the present invention. In communication system 900, a number of DVB coverage areas, or cells, exceeds a number of RNCs. Communication system 900 comprises a first Node B 912 that is serviced by a first RNC 910 and that provides MBMS services to a first coverage area 916 via a first downlink, that is, UMTS downlink 914. Communication system 900 further comprises a second Node B 930 that is serviced by first RNC 910 and that provides MBMS services to a third coverage area 934 via a third downlink, that is, UMTS downlink 932.

First RNC 910 also serves as a controlling RNC (CRNC) for each of a first DVB-H Node B 918 and a second DVB-H Node B 936. First DVB-H Node B 918 provides high data rate MBMS services to a second coverage area 922, that is, a high rate data coverage area, via a second downlink 920, that is, a high data rate DVB downlink, and which second coverage area overlaps with first coverage area 916. Second DVB-H Node B 936 provides high data rate MBMS services to a fourth coverage area, that is, coverage area 940, via a fourth downlink 938 that is also a high data rate DVB downlink and which fourth coverage area overlaps with third coverage area 934.

Communication system 900 further comprises a third Node B, that is, Node B 952, that is serviced by a second RNC, that is, RNC 950, and that provides communication services to a fifth coverage area, that is, coverage area 956, via a fifth, downlink, that is, UMTS downlink 954. Second RNC 950 also serves as a controlling RNC (CRNC) for a third DVB-H Node B 958 that provides high data rate MBMS services to a sixth coverage area 962, that is, a high rate data coverage area, via a sixth downlink 960 that is a high data rate DVB downlink. Sixth coverage area 962 overlaps with fifth coverage area 956.

A UE, that is, UE 902, initially resides in each of first coverage area 916 and second coverage area 922. The RNC serving coverage area 916, that is, RNC 910, establishes a Radio Resource Control (RRC) connection with UE 902, which connection terminates at each of the RNC and the UE. Thus, RNC 910 acts as the serving RNC (SRNC) for the RRC connection to UE 902. While UE 902 resides in first coverage area 916, communication system 900 provides MBMS services to UE 902 via a core network (not shown), first RNC 910, first Node B 912, and first downlink 914. Further, while UE 902 also resides in second coverage area 922, communication system 900 provides high data rate MBMS services to UE 902 via the core network, first RNC 910, DVB-H Node B 918, and second downlink 920.

UE 902 then moves to third coverage area 934 and to fourth coverage area 940, which coverage areas are also controlled by first RNC 910. Since the RNC serving the UE has not changed, the UE is not considered to have "drifted." Despite the move, the RRC connection with UE 902 continues to terminate at each of RNC 910 and the UE. While UE 902 resides in third coverage area 934, communication system 900 provides MBMS services to UE 902 via the core network, first RNC 910, second Node B 930, and third downlink 932. Further, communication system 900 provides high data rate MBMS services to UE 902 via the core network, first RNC 910, second DVB-H Node B 936, and fourth downlink 938.

UE 902 then moves to fifth coverage area 956 and to sixth coverage area 962, which coverage areas are controlled by second RNC 950. As a result of this move, the UE is considered to have "drifted" to RNC 950. Notwithstanding the move, RNC 910 continues to serve as the serving RNC (SRNC) (unless an SRNC relocation is performed) for UE 902 and the RRC connection to UE 902 continues to terminate at RNC 910. SRNC 910 establishes an Iur interface with the second RNC 950, and the second RNC then acts as a Drift RNC (DRNC) for the UE. When communication system 900 has non-high rate MBMS user information intended for UE 602, the communication system continues to route the data to SRNC 910 via the core network. SRNC 910 then conveys the data to DRNC 950 via the Iur interface and DRNC 950 conveys the data to UE 902 via third Node B 952 and fifth downlink 954. When communication system 600 has high rate MBMS data intended for UE 902, the communication system routes the high rate MBMS data to UE 902 via the core network, second RNC 950, third DVB-H Node B 958, and sixth downlink 960, bypassing RNC 910.

Figure 10:
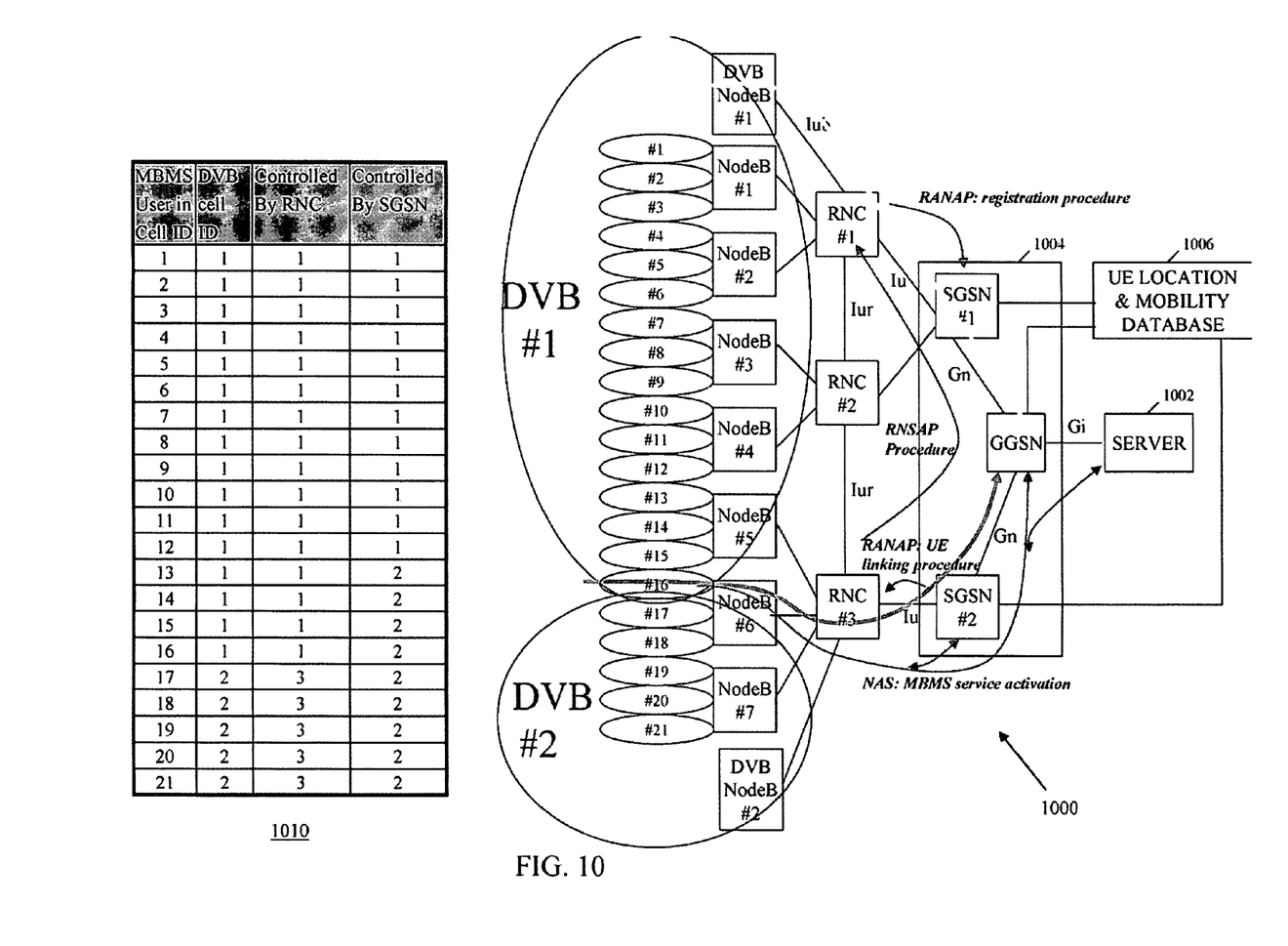
FIG. 10 is a block diagram of an exemplary multicast tree and an associated, exemplary routing table that is maintained by an exemplary communication system in association with an MBMS service in accordance with another embodiment of the present invention.

FIG. 10 is a block diagram of an exemplary multicast tree and an associated, exemplary routing table 1010 that is maintained by an exemplary communication system 1000 in association with an MBMS service in accordance with an embodiment of the present invention. Communication system 1000 comprises multiple Node Bs (seven shown), depicted in FIG. 10 as Node Bs #1-#7. Each Node B of the multiple Node Bs provides communication services to an associated coverage area, comprising one or more cells, and to UEs located in the coverage area. For example, as depicted in FIG. 10, Node B #1 provides communication services to cells #1-#3, Node B #2 provides communication services to cells #4-#6, Node B #3 provides communication services to cells #7-#9, Node B #4 provides communication services to cells #10-#12, Node B #5 provides communication services to cells #13-#15, Node B #6 provides communication services to cells #16-#18, and Node B #7 provides communication services to cells #19-#21. Communication system 1000 further comprises multiple RNCs (three shown), depicted in FIG. 10 as RNCs #1-#3. Each RNC of the multiple RNCs is coupled to one or more Node Bs of the multiple Node Bs via an Iub interface. For example, as depicted in FIG. 10, RNC #1 is coupled to each of Node Bs #1 and #2, RNC #2 is coupled to each of Node Bs #3 and #4, and RNC #3 is coupled to each of Node Bs #5, #6, and #7. The multiple RNCs are further coupled to each other via Iur interfaces.

Communication system 1000 further comprises a support node 1004 that is coupled to each of the multiple RNCs via an Iu interface. As depicted in FIG. 10, support node 1004 comprises multiple SGSNs (two shown), depicted in FIG. 10 as SGSNs #1 and #2, that are each coupled to a GGSN via a Gn interface. SGSN #1 is further coupled to RNCs #1 and #2 and SGSN #2 is further coupled to RNC #3. Support node 1004, and in particular each of SGSNs #1 and #2 and the GGSN, is further coupled to a UE Location and Mobility Database 1006 that operates similarly to UE Location and Mobility Database 150 of communication system 100 and that similarly comprises a Home Location Register (HLR), a Visitor Location Register (VLR), or a combination of an HLR and a VLR. Support node 1004, and in particular the GGSN, is further coupled to a Multimedia Broadcast/Multicast Service (MBMS) server 1002, preferably a Broadcast Multicast Service Center (BM-SC), via a Gi interface.

Communication system 1000 further includes multiple DVB-H Node Bs (two shown), depicted in FIG. 10 as DVB Node Bs #1 and #2. Each of the multiple DVB-H Node Bs is coupled to one or more RNCs of the multiple RNCs. For example, as depicted in FIG. 10, DVB Node B #1 is coupled to RNC #1 and DVB Node B #2 is coupled to RNC #3. Further, each of the multiple DVB-H Node Bs provides communications services to a high rate data coverage area and to UEs located in the coverage area via a high data rate downlink. For example, as depicted in FIG. 10, DVB Node B #1 provides communications services to DVB coverage area #1 and DVB Node B #2 provides communications services to DVB coverage area #2. DVB coverage area #1 overlaps with each of cells #1-#16 and DVB coverage area #2 overlaps with each of cells #17-#21. Thus a UE residing in any of cells #1-#21 is able to obtain MBMS services from one of the multiple Node Bs #1-#7 and is further able to obtain high rate MBMS services from one of the multiple DVB-H Node Bs #1 and #2.

Communication system 1000 may be considered to be organized as a multicast tree with respect to a delivery of an MBMS service. The tree starts at server 1002, which server is an entry point for MBMS data into communication system 1000. The data is then routed to support node 1004, and the support node replicates the MBMS data and routes the MBMS data to each RNC serviced by the support node and further serving a UE subscribed to the MBMS service, such as RNCs #1, #2, and #3. More particularly, server 1002 routes the MBMS data to a GGSN included in the support node. The GGSN routes the data to one or more SGSNs, such as SGSNs #1 and #2. Each SGSN #1, #2 then routes MBMS data received by the SGSN to each RNC serviced by the SGSN and further serving a UE subscribed to the MBMS service, such as RNCs #1 and #2 with respect to SGSN #1 and RNC #3 with respect to SGSN #2.

When the MBMS data is low rate data, each RNC #1, #2, #3 then routes the data to each Node B serviced by the RNC and further serving a UE subscribed to the MBMS service, such as Node Bs #1 and #2 with respect to RNC #1, Node Bs #3 and #4 with respect to RNC #2, and Node Bs #5, #6, and #7 with respect to RNC #3. Each Node B receiving MBMS data then conveys the data to UEs serviced by the Node B and subscribed to the MBMS service by multicasting or unicasting the data in the cells serviced by the Node B in accordance with well-known MBMS multicasting and unicasting techniques.

When the MBMS data is high rate data, RNCs #1 and #3 then route the data to each DVB-H Node B serviced by the RNC and further serving a UE subscribed to the MBMS service, such as DVB-H Node B #1 with respect to RNC #1 and DVB-H Node B #2 with respect to RNC #3. Each DVB-H Node B receiving MBMS data then conveys the data to UEs serviced by the DVB-H Node B and subscribed to the MBMS service in accordance with well-known DVB-H broadcasting techniques. Each data packet broadcast by the DVB-H Node B preferably includes a TMGI associated with the MBMS service, or other identifier of the MBMS service, that is included in the packet by one of server 1002, support node 1004, or an RNC and that allows the receiving UE to determine that it is an intended recipient of the data packet.

Routing table 1010 comprises a table for a routing of high rate MBMS data in communication system 1000. Table 1010 is a tabular depiction of the multicast tree described above and provides routing information for a routing of high rate MBMS data associated with an MBMS service through communication system 1000. In one embodiment of the present invention, each of the SGSN, RNCs, DVB-H Node Bs, high rate data coverage areas, and cells listed in table 1010 may comprise an SGSN, RNC, DVB-H Node B/high rate data coverage area, and cell serving a UE that subscribed to the MBMS service. In such an event, the table may be determined when the UEs subscribe to the service. A routing of high rate data for a particular MBMS service may then be determined based on cell IDs associated with UEs that have registered for the service. Preferably, table 1010 is maintained in an at least one memory device support node 1004, and more particularly in an at least one memory device of each SGSN included in the support node. However, table 1010 may be maintained anywhere in communication system 1000, such as in an at least one memory device of RNCs #1, #2, and #3, the GGSN, or server 1002, and retrieved by any element of communication system 1000 from the table's one or more storage locations in order to reference the table for a routing of MBMS data.

By assembling and utilizing a routing table that provides for a routing of high rate data and low rate data, a communication system delivering high rate MBMS data via a DVB-H Node B is able to appropriately route the data based on a determined location of a subscribed UE even when the high rate data coverage areas are not co-extensive with the low rate data coverage areas and the RNCs servicing the high rate data coverage areas differ from the RNCs servicing the corresponding low rate data coverage areas.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for delivery of a Multimedia Broadcast/Multicast Service (MBMS) comprising:
   receiving MBMS user information;
   routing the MBMS user information to a radio access network;
   determining, by the radio access network, one or more of whether the MBMS user information comprises low rate data, whether the MBMS user information comprises high rate data, and whether a high data rate connection can be established with a user equipment (UE);
   in response to determining the MBMS user information comprises low rate data or a high data rate connection cannot be established with UE, conveying, by the radio access network, the MBMS user information to the UE over an air interface of the radio access network and in a cellular format; and
   in response to determining that the MBMS user information comprises high rate data and a wireless high data rate connection can be established with the UE, conveying, by the radio access network, the MBMS user information to the UE over the air interface of the radio access network and the high data rate connection and in a Digital Video Broadcast format.

2. The method of claim 1, wherein the radio access network (RAN) comprises a cellular Node B and a Digital Video Broadcasting-Handhelds (DVB-H) Node B, wherein conveying the Multimedia Broadcast/Multicast Service (MBMS) user information over the air in a cellular format comprises routing the MBMS data to the cellular Node B, and wherein the conveying the MBMS user information over the air in a Digital Video Broadcasting format comprises routing the MBMS user information to the DVB-H Node B.

3. The method of claim 2, wherein the cellular Node B comprises a first cellular Node B, wherein the first cellular Node B provides services to a first coverage area, wherein conveying low rate Multimedia Broadcast/Multicast Service (MBMS) data over the air in a cellular format comprises routing the MBMS data to the first cellular Node B when the user equipment (UE) resides in the first coverage area, wherein conveying the MBMS data over the air in a Digital Video Broadcasting format comprises routing the MBMS user information to the Digital Video Broadcasting-Handhelds (DVB-H) Node B when the UE resides in the first coverage area, and wherein the method further comprises, when the UE moves to a second coverage area serviced by a second cellular Node B and the MBMS data comprises high rate data, conveying the MBMS data over the air via the DVB-H Node B.

4. The method of claim 3, wherein the first cellular Node B is serviced by a first Radio Network Controller (RNC), wherein the second cellular Node B is serviced by a second RNC, and wherein the method further comprises, when the user equipment (UE) resides in the second coverage area, routing low rate Multimedia Broadcast/Multicast Service (MBMS) data to the UE via the first RNC and the second RNC and routing high rate MBMS data to the UE via the second RNC and not the first RNC.

5. The method of claim 2, further comprising routing signaling associated with the high rate Multimedia Broadcast/Multicast Service (MBMS) data to the cellular Node B.

6. The method of claim 1, further comprising, when Multimedia Broadcast/Multicast Service (MBMS) data comprises signaling associated with high rate user information, routing the MBMS data to a Controlling Radio Network Controller (RNC) for conveyance to the user equipment (UE) while terminating a Radio Resource Control connection with the UE at a Serving RNC.

7. The method of claim 1, wherein conveying low rate Multimedia Broadcast/Multicast Service (MBMS) data over the air in a cellular format comprises routing the low rate MBMS data to a Serving Radio Network Controller (RNC) and wherein conveying high rate MBMS data over the air in a Digital Video Broadcasting format comprises routing the MBMS data to a Controlling RNC.

8. The method of claim 1, wherein conveying the Multimedia Broadcast/Multicast Service (MBMS) user information over the air in a Digital Video Broadcast (DVB) format comprises conveying the MBMS user information over the air via a Secondary Common Control Physical Channel allocated for conveyance of DVB data.

9. The method of claim 1, wherein conveying the Multimedia Broadcast/Multicast Service (MBMS) user information over the air in a Digital Video Broadcasting format comprises conveying the MBMS user information over the air via an MBMS Traffic Channel.

10. The method of claim 1, wherein conveying the Multimedia Broadcast/Multicast Service (MBMS) user information over the air in a Digital Video Broadcasting format comprises conveying the MBMS user information over the air via an MBMS Control Channel.

11. A radio access network (RAN) capable of providing a Multimedia Broadcast/Multicast Service (MBMS), the RAN comprising:
 a cellular Node B that conveys MBMS user information over an air interface via a low data rate channel;
 a Digital Video Broadcasting-Handhelds (DVB-H) Node B that conveys MBMS user information over an air interface via a high data rate channel; and
 a Radio Network Controller (RNC) that is coupled to each of the cellular Node B and the DVB-H Node B, that determines one or more of whether MBMS user information comprises low rate data, whether the MBMS user information comprises high rate data, and whether a high data rate connection can be established with a user equipment (UE) and, based on the one or more determinations, routes MBMS user information to one of the cellular Node B and the DVB-H Node B, wherein the Radio Network Controller (RNC) is configured to determine whether the Multimedia Broadcast/Multicast Service (MBMS) user information comprises low rate data, whether the MBMS user information comprises high rate data, and whether a high data rate connection can be established with a user equipment (UE), wherein in response to determining one or more of the MBMS user information comprises low rate data or a high data rate connection cannot be established with the UE, the RNC routes the MBMS user information to the cellular Node B, and wherein in response to determining that the MBMS user information comprises high rate data and that a high data rate connection can be established with the UE, the RNC routes the MBMS user information to the Digital Broadcasting Video-Handhelds Node B.

12. The radio access network of claim 11, wherein the Digital Video Broadcasting-Handhelds (DVB-H) Node B comprises an interworking function that is coupled to the Radio Network Controller, a DVB-H Gateway coupled to the interworking function, and a DVB-H modulator coupled to the DVB-H Gateway, and wherein the interworking function receives a data packet from the Radio Network Controller and performs a protocol conversion by converting the data packet from a cellular format to a format suitable for Digital Video Broadcasting protocol processing by the DVB-H Gateway.

13. The radio access network of claim 11, wherein the cellular Node B comprises a first cellular Node B, wherein the first cellular Node B provides services to a first coverage area, wherein the radio access network further comprises a second cellular Node B that provides services to a second coverage area, and wherein the Digital Broadcasting Video-Handhelds Node B provides high data rate Multimedia Broadcast/Multicast Service to each of the first coverage area and the second coverage area.

14. The radio access network of claim 13, wherein the Radio Network Controller (RNC) comprises a first RNC, wherein the radio access network further comprises a second RNC coupled to the second cellular Node B, and wherein, when the user equipment (UE) resides in the second coverage area, low rate Multimedia Broadcast/Multicast Service (MBMS) data is routed to the UE via each of the first RNC and the second RNC and high rate MBMS data is routed to the UE via the second RNC and not the first RNC.

15. The radio access network of claim 11, further comprising, when Multimedia Broadcast/Multicast Service (MBMS) data comprises signaling associated with high rate user information, routing the MBMS data to a Controlling Radio Network Controller (RNC) for conveyance to a user equipment (UE) while terminating a Radio Resource Control connection with the UE at a Serving RNC.

16. The radio access network of claim 11, wherein conveying MBMS user information over an air interface via low data rate channel further comprises routing the low rate MBMS data to a Serving Radio Network Controller (RNC) instance of the RNC and wherein conveying MBMS user information over an air interface via a high data rate channel further comprises routing the MBMS user information to a Controlling RNC instance of the RNC.

17. The radio access network of claim 11, wherein the Digital Video Broadcasting-Handhelds (DVB-H) Node B conveys the Multimedia Broadcast/Multicast Service (MBMS) user information over the air in a Digital Video Broadcasting format by conveying the MBMS data over the air via a Secondary Common Control Physical Channel allocated for conveyance of DVB data.

18. The radio access network of claim 11, wherein the Digital Broadcasting Video-Handhelds (DVB-H) Node B conveys the Multimedia Broadcast/Multicast Service (MBMS) user information over the air via an MBMS Traffic Channel.

19. The radio access network of claim 11, wherein the Digital Broadcasting Video-Handhelds (DVB-H) Node B conveys the Multimedia Broadcast/Multicast Service (MBMS) user information over the air via an MBMS Control Channel.

* * * * *